July 26, 1927.
O. B. PAULSON
1,637,048
HAY HARVESTING APPARATUS
Original Filed Jan. 5, 1926
2 Sheets-Sheet 1
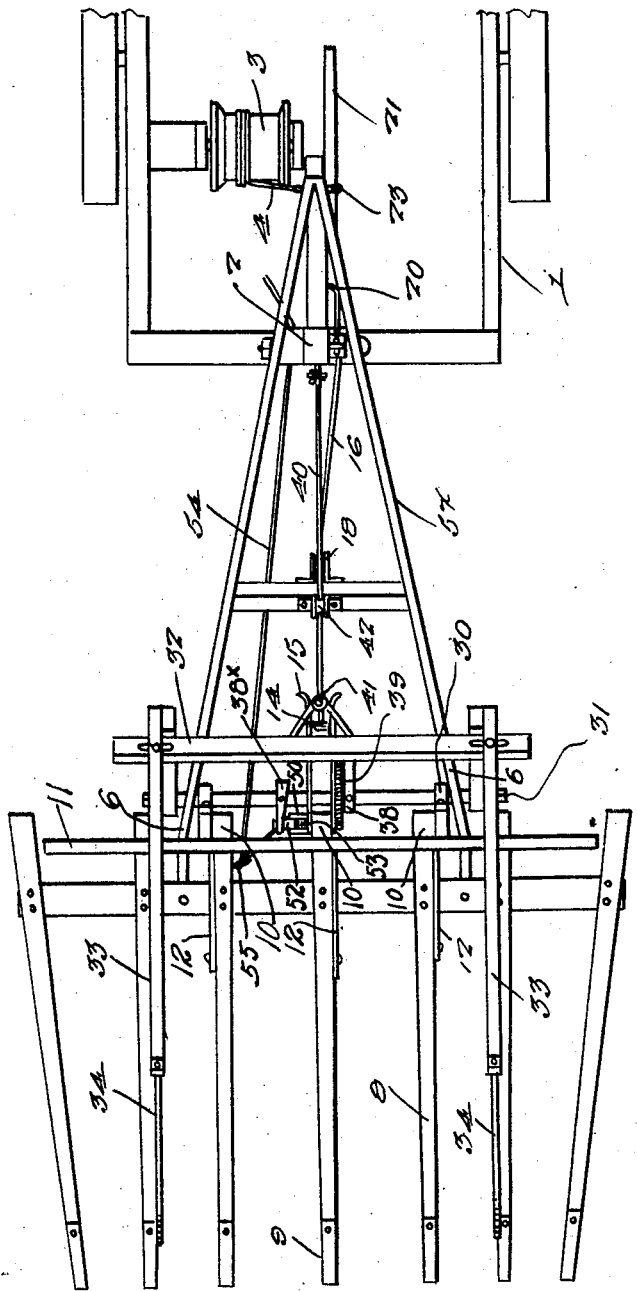
Inventor
O. B. Paulson
By Clarence A. O'Brien
Attorney

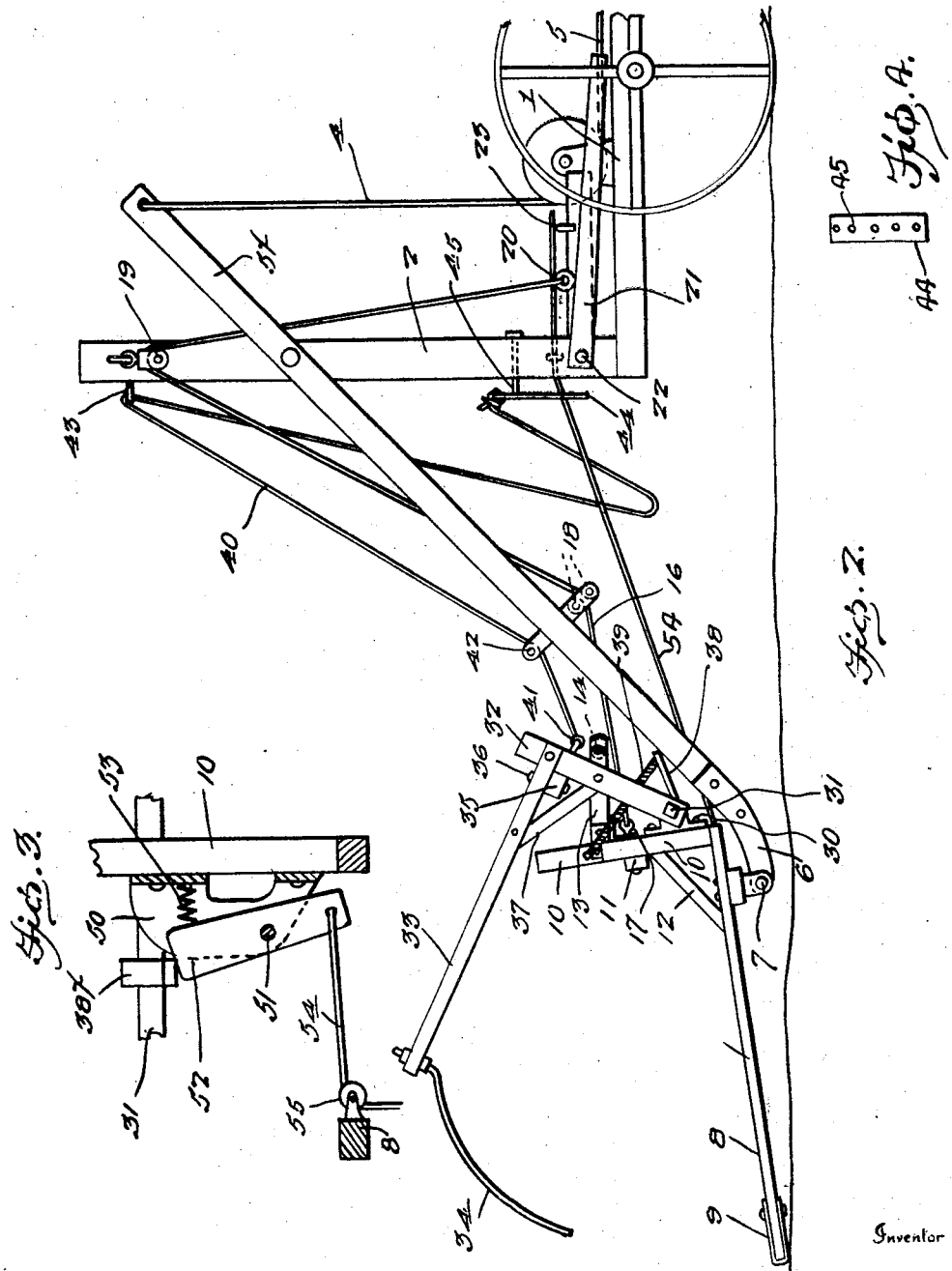

Patented July 26, 1927.

1,637,048

UNITED STATES PATENT OFFICE.

OLE B. PAULSON, OF GREAT FALLS, MONTANA.

HAY-HARVESTING APPARATUS.

Application filed January 5, 1926, Serial No. 79,349. Renewed June 20, 1927.

My present invention pertains to apparatus for harvesting and stacking hay, and contemplates the provision of an apparatus possessed of large capacity and characterized by the facility with which it may be operated for the gathering and carriage and stacking of hay.

With the foregoing in mind the invention and all of its details will be fully understood from the following description and claims when the same are read in connection with the drawings, accompanying and forming part of this specification, in which:—

Figure 1 is a top plan view of the apparatus constituting the best practical embodiment of my invention of which I am cognizant.

Figure 2 is a side elevation of the same.

Figure 3 is an enlarged fragmentary view illustrative of a peculiar and advantageous trip mechanism comprised in my improvement.

Figure 4 is a view of the plate 44 taken at right angles to Figure 2 and showing the apertures in said plate.

Similar numerals of reference designate corresponding parts in all of the views of the drawings.

I show in Figures 1 and 2 a portion of a tractor 1, the tractor frame being provided at 2 with a fixed upright, and the tractor being also equipped with a drum 3 about which is adapted to be wound a cable 4, a portion 5 of which, Figure 2, is adapted to be appropriately connected with a motor carried by the tractor for rocking the lever member 5× of my improvement. The lever 5× is fulcrumed on the upright 2, and the rear arm of the said lever member 5× is connected with the cable 4, and hence when the said cable 4 is drawn downwardly the forward arm of the lever member and the load imposed thereon will be raised. The lever member 5× has divergent portions 6, and pivotally connected at 7 to the said divergent portions 6 is the vertically swingable rake 8 of my improvement, the said rake being preferably formed of hard wood, and the tangs thereof being preferably shod with metal at their ends as designated by 9 and shown in Figures 1 and 2. The swingable rake 8 extends at opposite sides of the center of movement 7, and on the heel portion of the rake are fixed uprights 10 by which is carried a back bar 11. Braces 12 are preferably interposed between the uprights 10 and certain of the tangs and are fixed thereto. The intermediate upright 10 of the rake is longer than the side upright 10, as appears in Figure 2.

Fixed to and extending rearwardly from the intermediate upright 10 is an arm 13 which carries a sheave 14 and is provided at opposite sides of said sheave with divergent guides 15, designed to facilitate engagement of the sheave 14 with a cable 16. The said cable 16 is connected at 17 to the back of the intermediate uprights 10, and is passed between sheaves 18 carried by the lever member 5× and is also passed over a sheave 19 on the upright 2 and is connected at 20 to a vertically swinging hand lever 21, that is fulcrumed at 22 on the upright 2. Said upright movement of the lever 21 is limited by an abutment 23 of fixed character, but it will be readily understood that when the said lever 21 is thrust downwardly by an operative, the rake 8 will be swung on its center of movement 7 and the ends of the rake tangs will be raised from the ground. Manifestly when the lever 21 is released, the ends of the rake tangs will gravitate to the ground, Figure 2.

Carried on the back of the side uprights 10 of the rake are bearings 30, and journaled in said bearings 30 is a transverse rock shaft 31. Fixed to and rising from the said rock shaft 31 are arms 32 and fixed to and reaching forwardly from the said arms 32 are beams 33 on which are carried retaining tangs 34. A transverse bar 35 is arranged in front of the arms 32 and is also arranged below and is fixedly connected at 36 to the beams 33. At 37 are braces interposed between and fixed to the arms 32 and the beams 33. The rock shaft 31 has fixed to it at 38 an arm, and interposed between and connected to said arm 38 and the intermediate upright 10 of the rake is a retractile spring 39, the said spring 39 tending to return the beams 33 and tangs 34 to their lower positions and to retain said elements yieldingly in said positions. Manifestly the cross bar 35 is adapted to bring up against and be stopped by the intermediate upright 10 of the rake. A cable 40 is connected at 41 with the back of the central portion of the bar 35, and is passed under a sheave 42 on the lever member 5× and is also engaged with a guide 43 on the upright 2 and has its free end connected to a plate 44, Figure 2. The said plate 44 is provided at intervals in its height with apertures, Figure 4, and is therefore designed to be adjustably engaged with a projection 45 on the upright 2, this provision being made in order that the beams 33 and the tangs 34 may when moved to their normal positions operate to the best advantage.

It will be manifest from the foregoing that by pulling upon the pendent portion of the cable 40, the operator of the apparatus is enabled to swing the beams 33 and tangs 34 upwardly against the action of the spring 39, and it will also be readily apparent that on release of the pendent portion of the cable 40, the beams 33 and tangs 34, by reason of gravity plus the contraction of the spring will be automatically returned to their normal positions.

The intermediate upright 10 of the rake is provided at one side thereof with fixed spaced brackets 50 between which is fulcrumed at 51 a trip lever 52, the said lever 52 being adapted to cooperate with an arm 38ˣ fixed on the rock shaft 31. One arm of the trip lever 52 is backed by a spring 53, and the other arm of the trip lever is connected to a cable 54. When the arm 38ˣ and the trip lever 52 are relatively arranged as shown in Figure 3, the trip lever will operate to maintain the beams 33 and tangs 34 in raised position, as when the rake is being moved along the ground for the gathering of hay. When, however, the trip lever 52 is rocked by a pull on the cable 54, the upper arm of the lever 52 will be moved against the action of the spring 53 from under the arm 38ˣ, and consequently the beams 33 and tangs 34 will be left free to be moved to their lower normal positions. The cable 54 is carried about a sheave 55 on one of the tangs of the rake 8, Figures 1 and 3, and may be extended to any point of the apparatus most convenient for enabling an operator to release the beams 33 and tangs 34 in the manner described.

It will be gathered from the foregoing that through the medium of the rake moved by the tractor, hay and the like may be expeditiously gathered, and at the proper time the beams 33 and tangs 34 may be released to enable the same to retain the hay on the rake. It will also be appreciated that at the proper time the rake and the hay thereon may be elevated, and when the rake is in the proper position for delivery the beams 33 and tangs 34 may be moved to open position for the release of the hay from the rake.

Notwithstanding the practical advantages ascribed to my novel apparatus, it will be noted that the apparatus is simple and inexpensive in construction, and is well adapted to withstand the rough usage to which apparatus of corresponding character is generally subjected.

The construction herein illustrated and described constitutes the best practical embodiment of my invention of which I am aware, but I do not desire to be understood as confining myself to the specific construction and arrangement of parts as illustrated and described, my invention being defined by my appended claims within the scope of which changes in structure and changes in relative arrangement may be made without departure from my invention.

Having described my invention, what I claim and desire to secure by Letters Patent, is:—

1. The combination of a rake having an upright back portion, a rock shaft journaled on said back portion, swingable retaining means carried by said rock shaft and disposed and movable above the rake, an arm fixed to and extending laterally from the rock shaft, movable means on the rake constructed and arranged to automatically engage the rock shaft arm when the retaining means is raised and thereby detachably secure said retaining means in raised position, and means connected with said movable means whereby the latter may be moved for the release of the retaining means by a person remote from the rake.

2. The combination of a rake having an upright portion at the back end thereof, a transverse rock shaft carried by said upright portion, said rock shaft having an arm, retaining means fixed to and movable with said rock shaft, a spring for impelling said retaining means downwardly, a lever carried by the rake upright and subject to the action of spring means and normally resting in position to engage the arm of the rock shaft and to cooperate with said arm in preventing downward movement of the retaining means, and a connection with said lever through the medium of which it may be rocked for the release of the arm of the rock shaft.

3. The combination of a rake having an intermediate upright and side uprights at its back end, brackets fixed to the side of the intermediate upright, a trip lever fulcrumed between said brackets and subject to the action of a spring and having connection with means through which it may be rocked against the action of the spring, a rock shaft journaled in bearings on the side uprights and having arms fixed to said shaft, one of said arms arranged for cooperation with the trip lever, a retractile spring interposed between and connected to the other arm and the intermediate upright, and manually controlled means through the medium of which retaining means fixed to and movable with the rock shaft may be raised.

4. In hay harvesting apparatus and in combination, a vertically swingable lever member, said member supported and fulcrumed at an intermediate point in its length, means connected with the inner arm of said lever for raising the outer arm thereof, a rake pivoted to the outer arm of the lever and having an upright back, a cable connected to said back and guided on the lever, a second cable guided on the lever member, vertically swingable retaining means carried by the back portion of the rack and connected with said second cable, cooperating means on the rake and the retaining means for holding the latter detachably against downward movement, and means through the medium of which the retaining means may be released.

5. In hay harvesting apparatus and in combination, a wheeled support, an upright thereon, a vertically swingable lever member fulcrumed at an intermediate point of its length on said upright, a cable connected with the inner arm of said lever member for the rocking thereof, a rake pivotally connected to the outer portion of the lever member and having an upright back portion, a rock shaft journaled on said portion of the rake and having arms and carrying retaining means, a retractile spring interposed between one of said arms and the back of the rake, means in the form of a cable connected to the back of the rake and guided on the lever member and also on the upright, whereby the rake may be rocked, a spring-pressed trip lever carried by the back of the rake and adapted to cooperate with the other arm of the rock shaft, a connection to said trip lever whereby the same may be readily manipulated, and a cable connected with the retaining means and guided on the lever member and the support.

6. In hay harvesting apparatus and in combination, a vertically swingable lever member, means on said lever member for guiding cables, a rake pivotally connected with the lever member and having an upright back portion, said portion being provided with a rearwardly extending arm, a sheave carried by said arm, and guide portions at opposite sides of said sheave for cooperation with a cable, the said cable guided on the lever member and connected with the back of the rake, rockable retaining means carried by the back portion of the rake, a cable connected with said retaining means and engaged with one of the guides of the lever member, and means on the rake and cooperating means on the retaining means whereby the retaining means will be detachably secured in raised position when elevated to said position.

In testimony whereof I affix my signature.

OLE B. PAULSON.